March 22, 1966 R. V. BEVERLY 3,241,262
FISHING FLOAT
Filed July 23, 1964
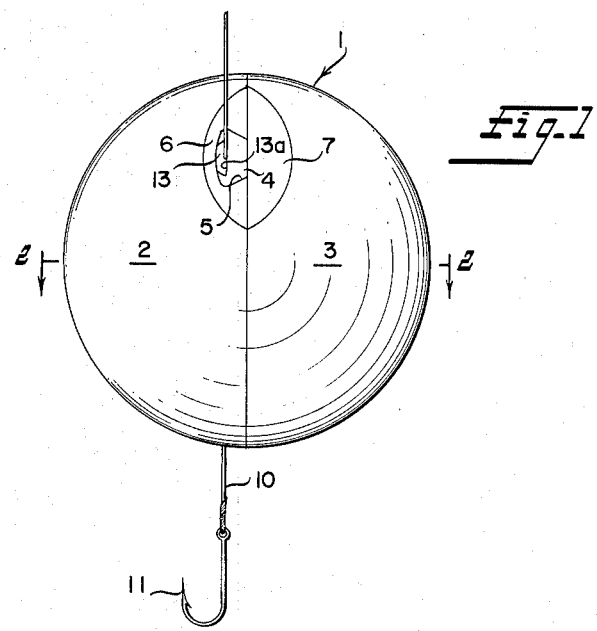
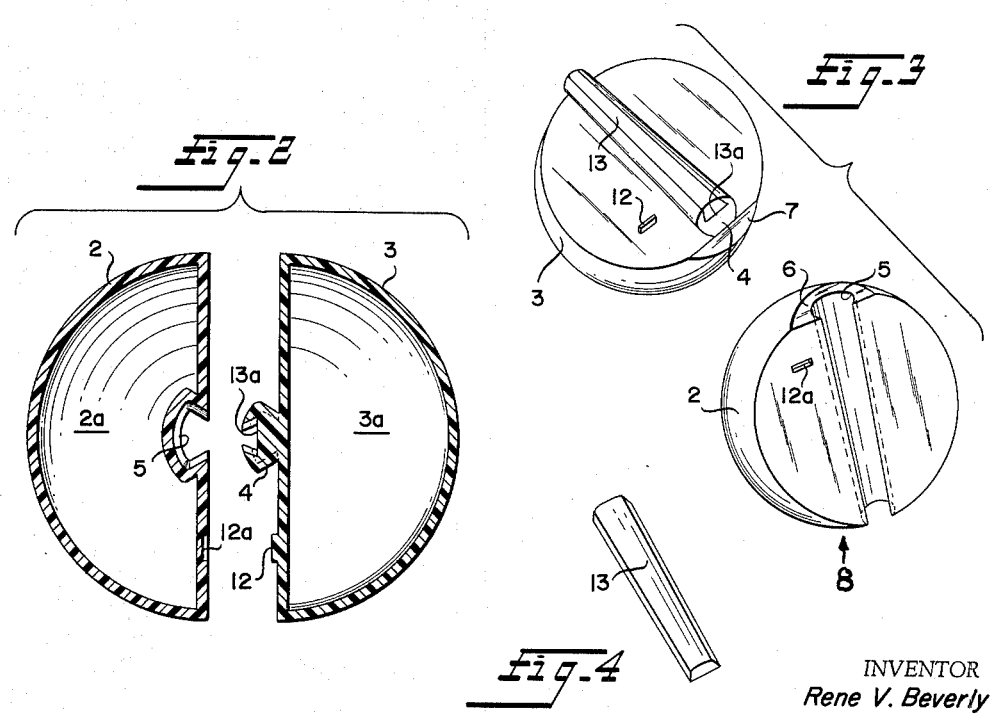
INVENTOR
Rene V. Beverly
BY Ray & Mitchell
ATTORNEY

United States Patent Office 3,241,262
Patented Mar. 22, 1966

3,241,262
FISHING FLOAT
Rene V. Beverly, 2509 Metairie Court Parkway,
Metairie, La.
Filed July 23, 1964, Ser. No. 384,645
2 Claims. (Cl. 43—44.91)

This invention relates to fishing floats, and more particularly to an improvement in fishing floats which are readily attachable and detachable to and from a fishing line. This invention is an improvement on my fishing float as disclosed in my copending application S.N. 355,-648 filed March 30, 1964. Fishing floats of this general type are illustrated in the U.S. Patent 2,881,552 to Miller.

The principal object of the present invention is to provide a fishing float which is readily attachable to and adjustable along a fishing line without disconnecting the line from the fishing rod or removing any other part attached to the line such as leaders, sinkers, hooks, and lures.

A further object is to provide an improved fishing float which may be attached to or detached from a fishing line without the use of tools.

Another object is to provide an improved fishing float which may be readily and speedily adjusted along the fishing line thereby regulating the depth of a bait.

Still another object is to provide an improved fishing float simple in construction permitting inexpensive manufacture, preferably of plastic or other noncorrosive material.

The invention in the foregoing aspects and in others subsidiary or related thereto will be fully apprehended from the following detailed description of a preferred embodiment thereof, taken in conjunction with the appended drawing, in which:

FIG. 1 is a side view of the assembled float showing a fishing line therethrough;

FIG. 2 is a sectional view of the float taken from FIG. 1 along the line 2—2;

FIG. 3 is an exploded view of the improved fishing float;

FIG. 4 shows a resilient insert.

Similar reference characters are applied to similar elements throughout the drawing.

Referring now to the drawing, FIG. 1 shows the assembled fishing float, generally indicated by the numeral 1, comprising members 2 and 3. While the float could be made from any solid material lighter than an equal volume of water, the preferred embodiment as illustrated comprises a pair of substantially hemispherical thin-walled members 2, 3 wherein the said walls of necessity define buoyancy chambers 2a, 3a as best seen in FIG. 2. Here again any suitable material may be used, but plastic is preferable from an economic standpoint. While each of the members 2, 3 are substantially hemispherical, member 2 may be slightly thicker than member 3 so that the fishing line 10 passes through the center of the assembled float, as taught in my copending application S.N. 355,648 hereinbefore referred to. The assembled float 1 is substantially spherical but the shape of the float is not critical and may assume other configurations.

The means for holding the two buoyant members together comprise a longitudinally tapered convex tenon 4 integral with the member 3 and a concave tapered groove or mortise 5 on member 2 corresponding to the tenon 4. The tenon 4 is provided with a longitudinal recess or mortise 13a which receives a resilient insert 13 of corresponding shape (see FIG. 4). The insert 13 may be of any suitable resilient material such as rubber for example. Member 2 is provided with a ridge or protuberance 12, which may be 1/16 of an inch in height, which is adapted to fit into the recess 12a carried on the member 3. The rubber insert 13 grips the fishing line 10 and together with the ridge 12 and recess 12a holds the two members together when assembled.

As seen in FIGS. 1 and 3, bevels 6 and 7 are provided on members 2 and 3, respectively, and these bevels define a cleft at the top portion of the float. In contrast, the bottom part 8 of the float 1 is smooth.

In preparing the float for use, the fishing line 10 is placed in the center of the groove 5 of member 2, or behind the insert 13 in member 3, as desired, and assembly is accomplished by sliding the tapered tenon 4 into the tapered mortise 5 until the ridge 12 snaps into the recess 12a. FIG. 1 shows the assembled float. The resilient strip 13 prevents the float from sliding along the fishing line.

To remove the float 1 from the line 10, for example to adjust the length of line 10 between the float 1 and hook 11, it is appropriate to grip the float with both hands with the thumbs on the bevels 6, 7 and with the fingers along the bottom 8 of the float, spread the two members apart sufficiently to allow the ridge 12 to clear the recess 12a, then slide member 3 from member 2 in a direction opposite to that used to assemble the float.

From the foregoing it will be apparent to those skilled in the art that there is shown and described herein a novel and useful fishing float having numerous advantages over the prior art. While for purposes of description there has been shown and described a specific embodiment of this invention, it will be apparent that changes and modifications can be made therein without departing from the spirit of my invention or the scope of the appended claims.

I claim:

1. A separable fishing line float comprising a first and a second buoyant member, a tapered mortise on said first buoyant member, a tapered tenon on said second buoyant member, said mortise and tenon providing means for assembly and disassembly of said float, there being a longitudinal recess in said tenon, an insert of resilient material in said recess, a ridge on said first buoyant member, there being a recess on said second buoyant member, said ridge and recess cooperating to hold said members in assembled relationship.

2. A separable fishing line float comprising: first and second buoyant members; a tapered mortise on said first buoyant member; a tapered tenon provided with a longitudinal recess therein on said second buoyant member; and an insert of resilient material in said longitudinal recess in said tenon, said mortise and tenon providing means for assembly and disassembly of said float.

References Cited by the Examiner
UNITED STATES PATENTS

| 769,454 | 9/1904 | Ankers | 248—225 |
| 1,240,043 | 9/1917 | Gregory et al. | 43—44.9 |

FOREIGN PATENTS

| 556,508 | 4/1958 | Canada. | |

SAMUEL KOREN, *Primary Examiner.*